(12) United States Patent
Antaya et al.

(10) Patent No.: US 6,730,848 B1
(45) Date of Patent: May 4, 2004

(54) TECHNIQUES FOR CONNECTING A LEAD TO A CONDUCTOR

(75) Inventors: Stephen C. Antaya, West Kingston, RI (US); Manuel H. Machado, Hope, RI (US)

(73) Assignee: Antaya Technologies Corporation, Cranston, RI (US)

( * ) Notice: Subject to any disclaimer, the term of this patent is extended or adjusted under 35 U.S.C. 154(b) by 0 days.

(21) Appl. No.: 10/176,946

(22) Filed: Jun. 20, 2002

Related U.S. Application Data

(60) Provisional application No. 60/302,087, filed on Jun. 29, 2001.

(51) Int. Cl.[7] .............................................. H02G 15/02
(52) U.S. Cl. ..................... 174/78; 174/84 C; 174/88 R; 174/94 R; 174/117 F
(58) Field of Search ............................ 174/117 F, 78, 174/84 C, 94 R, 88 R

(56) References Cited

U.S. PATENT DOCUMENTS

| | | |
|---|---|---|
| 1,052,761 A | 2/1913 | Steinweg |
| 1,980,890 A | 11/1934 | Tompkins |
| 2,386,628 A | 10/1945 | Nazzewski |
| 2,530,552 A | 11/1950 | Stoddard et al. |
| 2,565,477 A | 8/1951 | Crowell et al. |
| 2,930,113 A | 3/1960 | Greco |
| 3,184,303 A | 5/1965 | Grobin et al. |
| 3,209,792 A | 10/1965 | Nowell et al. |
| 3,333,047 A | 7/1967 | Geoffroi |
| 3,358,898 A | 12/1967 | Medkeff et al. |
| 3,472,944 A | 10/1969 | Morton et al. |
| 3,541,227 A * | 11/1970 | Bendrick .................. 174/94 R |
| 3,548,078 A | 12/1970 | Albrecht et al. |
| 3,627,191 A | 12/1971 | Hood |
| 3,638,154 A | 1/1972 | Sampson et al. |
| 3,688,376 A | 9/1972 | Pokhodnya et al. |
| 3,705,047 A | 12/1972 | Marriott |
| 3,715,797 A | 2/1973 | Jackson et al. |
| 3,726,464 A | 4/1973 | Howell et al. |
| 3,954,572 A | 5/1976 | Ziegler et al. |
| 3,978,569 A | 9/1976 | Cobaugh et al. |
| 4,079,187 A | 3/1978 | Fillunger et al. |
| 4,090,768 A | 5/1978 | Tregoning |
| 4,137,369 A | 1/1979 | Chaikin |
| 4,161,062 A | 7/1979 | Agatsuma et al. |
| 4,164,606 A | 8/1979 | Spirig |
| 4,263,474 A * | 4/1981 | Tennant ..................... 174/84 C |
| 4,298,789 A | 11/1981 | Eichelberger et al. |
| 4,416,408 A | 11/1983 | Spirig |
| 4,426,550 A | 1/1984 | Luhman et al. |
| 4,431,862 A | 2/1984 | Luhman et al. |
| 4,785,988 A | 11/1988 | Topel et al. |
| 4,874,930 A | 10/1989 | Voss et al. |

(List continued on next page.)

FOREIGN PATENT DOCUMENTS

| | | |
|---|---|---|
| DE | 3312190 C1 | 4/1984 |
| EP | 0 450 838 A1 | 10/1991 |
| EP | 0 711 628 A1 | 5/1996 |
| GB | 732710 | 3/1953 |
| GB | 1426873 | 3/1976 |
| JP | 55-97231 | 7/1980 |
| JP | 62-220269 | 9/1987 |
| JP | 60-79490 | 3/1994 |
| JP | 7-142100 | 2/1995 |

*Primary Examiner*—Chau N. Nguyen
(74) *Attorney, Agent, or Firm*—Hamilton, Brook, Smith & Reynolds, PC

(57) ABSTRACT

A connector device is shaped or formed to include bendable flaps for securing one or more conductors when the flaps are crimped. Typically, the connector device includes a base having an external surface that is eventually affixed to a complementary shaped surface. Accordingly, a conductor can be attached to the complementary shaped surface. For example, one or more conductors can be crimped via the connector device, which is thereafter attached to a complementary surface.

24 Claims, 7 Drawing Sheets

U.S. PATENT DOCUMENTS

| | | |
|---|---|---|
| 4,876,178 A | 10/1989 | Voss et al. |
| 4,968,550 A | 11/1990 | Socha |
| 5,023,403 A | 6/1991 | Eckardt et al. |
| 5,052,611 A | 10/1991 | Socha |
| 5,083,698 A | 1/1992 | Forsha |
| 5,088,007 A | 2/1992 | Missele |
| 5,094,139 A | 3/1992 | Forsha |
| 5,119,106 A | 6/1992 | Murakami |
| 5,143,273 A | 9/1992 | Topel et al. |
| 5,239,749 A * | 8/1993 | Fujimaki et al. ............... 29/877 |
| 5,293,001 A | 3/1994 | Gebs |
| 5,305,941 A | 4/1994 | Kent et al. |
| 5,334,988 A | 8/1994 | Murakami et al. |
| 5,342,996 A * | 8/1994 | Ito ........................... 174/84 C |
| 5,386,345 A | 1/1995 | Matsuzaki et al. |
| 5,769,665 A | 6/1998 | Neely et al. |
| 6,042,932 A * | 3/2000 | Ingles et al. ................. 428/209 |
| 6,232,555 B1 * | 5/2001 | Besler et al. ............. 174/84 C |

* cited by examiner

TECHNIQUES FOR CONNECTING A LEAD TO A CONDUCTOR

RELATED APPLICATIONS

This application claims the benefit of U.S. Provisional Application Ser. No. 60/302,087 filed on Jun. 29, 2001, the entire teachings of which are incorporated herein by this reference.

BACKGROUND OF THE INVENTION:

Creating a solder connection between a conductor such as a braided wire and a conductive node can be tedious, especially when the conductive node or underlying material is sensitive to extreme temperature. To create such a connection, a hot soldering iron is generally applied to the surface of the conductor and the conductive node, forcing the two conductors in contact with each together. Heat from the hot solder iron tip flows through the material, increasing the temperature of both conductors. After both conductors reach a desired temperature, a solder wire is typically provided in contact with the two conductors and hot soldering iron. Upon contact, the solder melts and flows to fill the void between the conductors. After the area cools, a solid conductive solder contact bond remains, holding the two conductive terminals together.

Unfortunately, the process of soldering a braided wire to a conductive node involves incidentally heating the underlying conductive substrate as well as the braided wire to extreme temperatures. Overheating the material underlying the conductive substrate can stress the material creating a structural weak spot. This is particularly true when the material is sensitive to thermal exposure such as when the substrate is glass. Needless to say, structural weakening of this material, or any material for that matter, is undesirable because it increases the likelihood of a premature product failure.

The method of soldering a braid of wire to a conductive contact can also be a cumbersome process. Soldering braided wire can require three hands: a first to direct the solder iron, a second to direct the solder wire and a third to hold the braided wire in place. When only two hands are used, as is often the case, it is difficult to simultaneously control the direction of solder wire and hold the braided wire in place using only one hand. Hence, it is difficult to maneuver the solder wire to the desired area during the soldering process. In addition, a technician can miscalculate how long it takes to heat an area to be soldered. Overheating an area with a solder iron can stress the underlying material.

SUMMARY OF THE INVENTION

One aspect of the present invention is directed towards a system and method of securing conductors. In an illustrative embodiment, a connector device is shaped to include bendable flaps for securing one or more conductors such as a conductive strip and a lead wire. The connector device can include a base having an external surface that is eventually affixed to a complementary shaped surface. A portion of the conductor can also be attached to the complementary shaped surface. Accordingly, a conductor strip and connector device can be securely fastened to the complementary shaped surface.

In one application, one or more conductors are crimped into the connector device, which is attached to a complementary surface.

The connector device can be made from a strip of flat metal and can be formed to include bendable flaps. A portion of the metal strip can form the external surface that is eventually attached to a complementary surface.

In another application, the external surface of the connector device is flat such that the external surface of the connector device and at least a portion of the conductor strip lie in a common plane for attachment to a complementary shaped surface such as a flat surface.

In yet another application, the connector device for crimping conductors includes two or more sets of bendable flaps so that multiple conductors can be crimped together. For example, a first set of bendable flaps can be used to crimp a conductor such as a lead wire to the connector device while a second set of bendable flaps can be used to crimp yet another conductor to the connector device. Accordingly, two or more conductors can be crimped to a common electrode such as the connector device itself.

Although the connector device can be made of any suitable material such as an insulating material, it is optionally electrically conductive. Thus, when the connector device is formed out of metal such as copper, the external surface of the connector device can be soldered to a complementary shaped surface. The conductor strip is also optionally soldered to the complementary surface.

Another aspect of the present invention involves shaping the connector device to include a tongue for attaching a lead wire. For example, the connector device can include a protruding extension to which a lead wire can be removably or permanently attached. The tongue can be formed or bent so that it rests above a complementary surface to which the connector device is attached.

Another aspect of the present invention involves providing a connector device having bendable flaps for securing one or more conductors such as a conductor strip when the flaps are crimped. The conductor strip can be a flat strip of metallic or conductive material. As previously discussed, the connector device can include an external surface for attachment to a complementary shaped surface. Thus, the connector device can be used to attach one or more crimped conductors to the complementary surface. Also, a portion of the conductor strip itself can be attached to a complementary shaped surface.

Generally, the bendable flaps can be bent inwards or towards each other to crimp the conductor such as a flat conductive strip to the connector device. More specifically, a connector device can be crimped around a lengthwise portion of a conductive strip to attach another conductor such as a distal end of a lead wire to the conductor strip.

The connector device can be made of electrically conductive metal, although even a non-conductive material can be used to form the connector device.

In one application, a conductor strip is positioned in a channel formed by bendable flaps and a lead wire is then crimped to the elongated conductor strip by bending the flaps inward. A portion of the flat conductor strip extending through the connector device can be formed or bent so that the flat conductive strip lies in a common plane with the external surface of the connector device.

One method of bending a portion of the flat conductive strip includes applying a force on a portion of the conductive strip extending beyond an edge of the connector device so that at least a portion of the conductive strip generally lies flat lengthwise along a surface such as a planar or curved surface. Consequently, a flat conductive strip and base of the connector device can lie in a common plane on a corresponding surface to which the entire assembly can be attached.

The conductive strip can be a braided wire with a solder core. Thus, an assembly including a connector device and braided wire lying flat on a surface can be heated to melt the solder and attach the braided wire and connector device to a corresponding complementary shaped surface.

The complementary surface to which the braid wire is attached can be a conductive layer disposed on glass or glass itself such as a surface of an automobile window. The conductor and connector assembly can also be attached directly to glass or other surface using a solder process. Accordingly, a voltage can be applied to the conductive layer through a lead wire attached to the connector device.

An elongated conductor strip crimped in the connector device is optionally a braided wire that is pre-soaked in previously heated solder. In such a case, the conductive strip and connector device can be affixed to a complementary surface by melting the solder in the braid.

Generally, the conductor strip can be flexible so that it can conform to the shape of a complementary surface to which it is eventually attached. Accordingly, it is an easier task to secure an assembly including the conductor strip to a complementary surface. Preferably, the conductor strip is substantially similar to the complementary surface to which it is secured, but an exact matching of contoured surfaces is not necessary when the conductor is more flexible. That is, the conductor can be somewhat malleable so that it can be formed for attachment to a particular surface.

Spaced masses of solder can be attached along a length of an elongated conductor strip to which the connector device is crimped. Thereafter, heat can be applied to the elongated conductor and connector device to melt the solder masses for attaching the elongated conductor to a corresponding surface.

One application of the inventive combination of materials such as a lead wire attached to a conductor is a rear window of an automobile or even glass itself. In such an application, a lead wire can be crimped to a conductor such as a braided wire via the connector device. This combination of conductive strip and connector device can then be soldered to a heater or defroster strip disposed on glass. For example, a base of the connector device and conductive strip such as braided wire can be soldered to a conductive layer disposed on a rear window of an automobile. A lead wire can be crimped by the connector device to contact the braid. The assembly can also be soldered directly to a glass window. Consequently, a voltage then can be applied to the heater strip via a connection between the lead wire crimped to the connector device, which in turn is attached to the heater strip.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiment follows.

Figure 1:
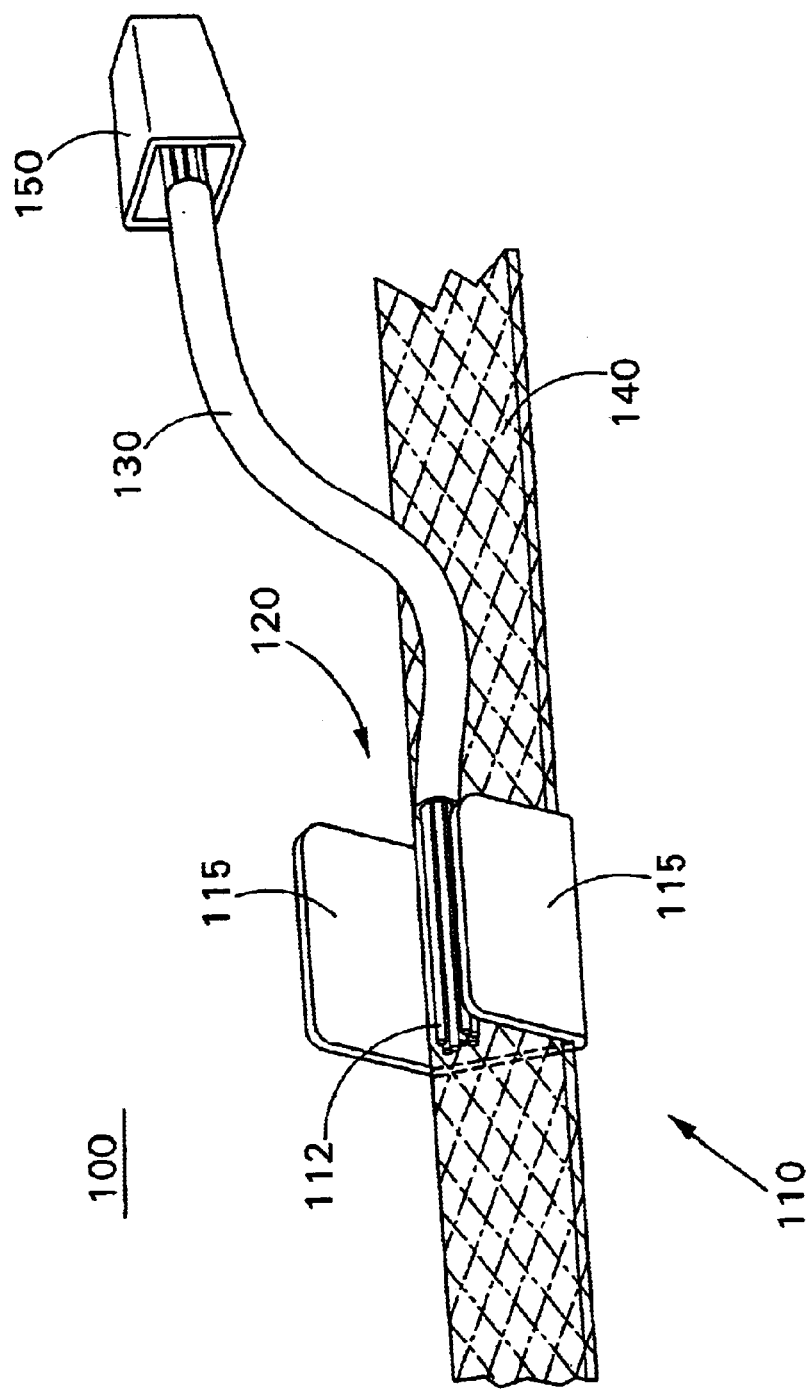
FIG. 1 is a diagram of a connector device for attaching a lead wire to a conductor according to certain principles of the present invention.

FIG. 1 is a diagram illustrating an assembly for connecting a lead wire to a conductor strip according to certain principles of the present invention.

As shown, connector device 110 includes channel 120 formed by bendable flaps 115. Generally, bendable flaps 115 can be crimped or bent inward to secure any number of conductors. For example, lead wire 130 including exposed wire strands 112 can be secured to conductor 140 by positioning distal end of lead wire 130 and conductor 140 in channel 120 and, thereafter, bending flaps 115 inward with a corresponding crimping tool. Accordingly, a connector 150 of lead wire 130 can be electrically connected to conductor 140 through lead wire 130.

Although FIG. 1 illustrates a connection between a conductor 140 such as a flat conductor strip such and lead wire 130, generally any type of conductor strips can be secured to a complementary surface.

One aspect of the present invention concerns the shape of connector device 110. Generally, a surface of connector device 110 can be shaped for attachment to a substantially complementary surface. That is, the shape of a surface of connector device 110 can have a surface contour that substantially matches that of a complementary surface to which it is attached. For example, a base or bottom surface of connector device 110 can be flat so that it can be attached to a corresponding approximately flat surface. According to this aspect of the invention, connector device 110 can be more easily attached to a complementary surface via a strong solder bond.

In one application, connector device 110 is fabricated from malleable metal such as copper or tinned copper so that connector device 110 can be soldered to a complementary shaped surface such as metal or glass. As shown, conductor 140 can be a flat strip of metallic material such as a braided wire so that assembly 100 generally has a planar shape along bottom of conductor 140 and connector device 110. Consequently, a planar surface of assembly 100 including base of connector device 110 and surface of conductor 140 can be soldered to a complementary shaped surface.

Figure 2:
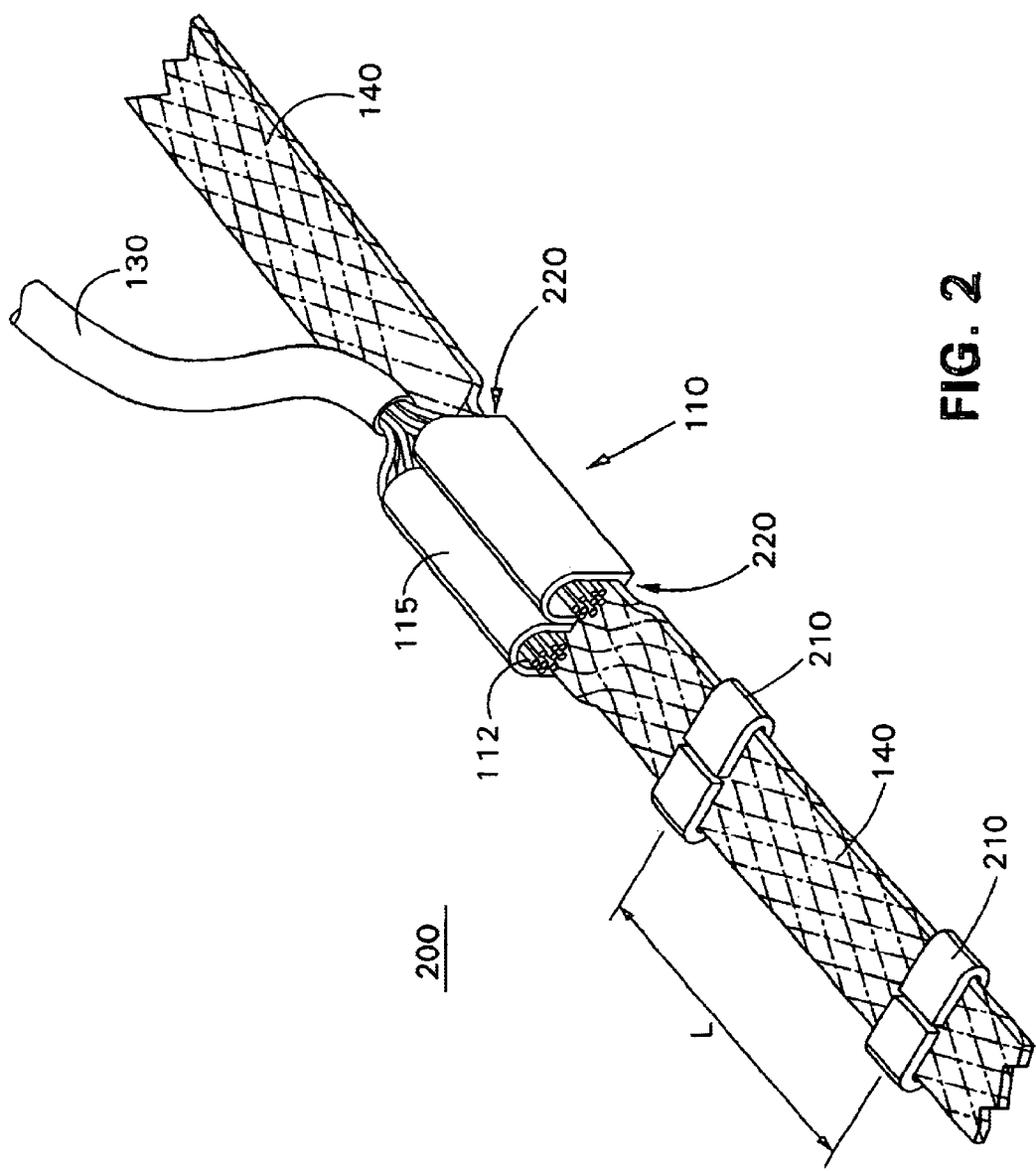
FIG. 2 is a diagram of a crimped connector device attaching a lead wire to a conductor according to certain principles of the present invention.

FIG. 2 is a diagram of a conductor attached to a lead wire according to certain principles of the present invention.

As previously discussed, wire strands 112 at distal end of lead wire 130 can be crimped to conductor 140. Solder masses 210 such as strips of solder with a flux core can be attached or crimped along a length of conductor 140. Typically, solder masses 210 are spaced at a specified distance such as length, L, apart from each other. Solder masses 210 need not include a flux core.

When used, the addition of the spaced solder masses 210 renders it easier to solder assembly 200 to a corresponding surface. For example, conductor 140 can be soldered to a complementary surface by heating conductor 140 and solder masses 210 accordingly. Thus, a predetermined mass of solder can be melted to provide a solder connection between conductor 140 and underlying surface. Also, crimping solder masses 210 along a length of the conductor simplifies the soldering process since an extra hand is no longer necessary to hold the solder in close proximity to the conductor 140. Rather, the solder masses can be attached to conductor 140. Based on this aspect of the invention, assembly 200 can be more easily soldered to a complementary surface such as a planar surface area of glass.

Solder masses 210 can include a flux core or an external dab of flux (between solder mass 210 and conductor 140) can be provided so that the melted solder flows more easily during the attachment process. In one embodiment, the solder masses themselves do not include flux in their core. However, when solder masses 210 do include flux in their core, the end of solder masses 210 are preferably tapered so that a substantial amount of the flux remains within the core of a solder mass 210 when it is crimped to conductor 140.

Another aspect of the present invention involves shaping conductor 140 so that it can be attached to a complementary surface. For example, a portion of conductor 140 extending through crimped portion of connector device 110 is bent near sections 220 so that bottom portion of connector device 110 and conductor 140 are generally flat along their length. This is shown in more detail in FIG. 3.

Figure 3:
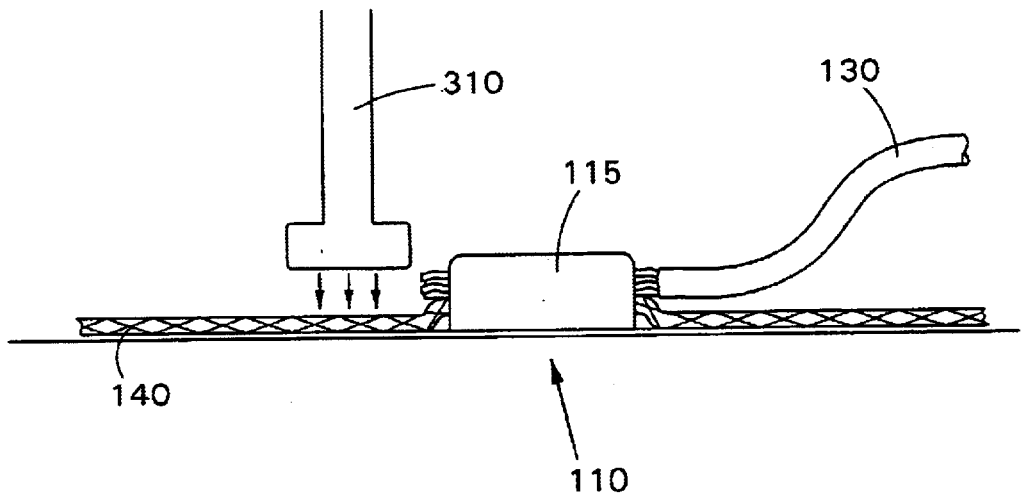
FIG. 3 is a side view diagram of flattening a conductor according to certain principles of the present invention.

FIG. 3 is a side view diagram illustrating a process of bending a conductor according to certain principles of the present invention.

To shape conductor 140, a force is applied via stamp 310 so that conductor 140 and connector device 110 generally lie flat or form a contoured surface. Consequently, assembly 200 can be more easily attached to a complementary surface. Of course, conductor and/or bottom surface of connector device 110 can be shaped for attachment to any shaped surface contour.

As shown, a conductor 140 and connector device 110 can be formed for attachment to a particular surface contour. For instance, a portion of conductor 140 such as a conductor strip can be bent or formed so that an external surface of connector device 110 and, a portion of conductor 140 conform to a selected contour. One such selected contour is a flat surface of glass. Notably, conductor 140 can be flexible so that conductor 140 conforms to a complementary surface with minimal effort.

Figure 4:
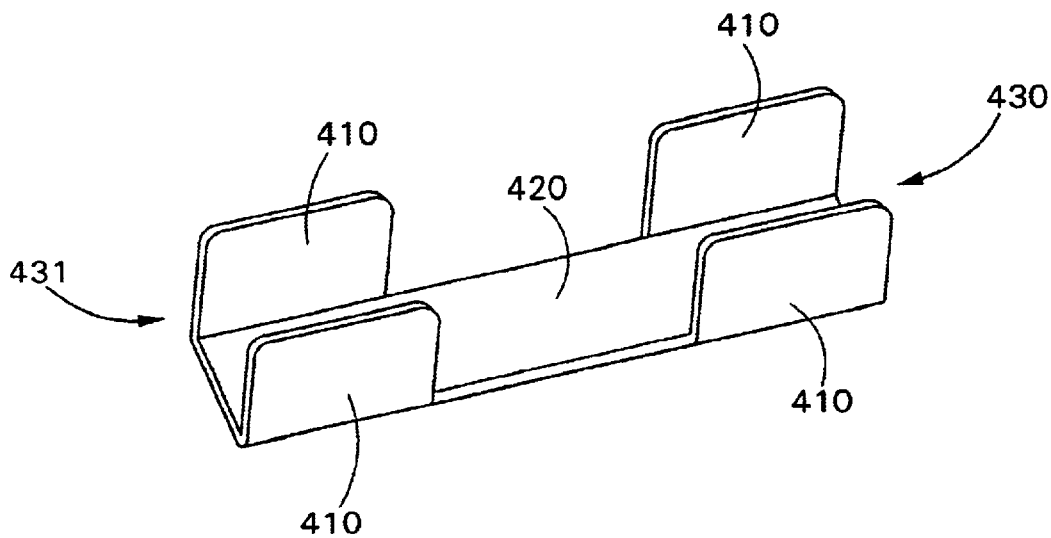
FIG. 4 is a diagram illustrating a connector device including multiple sets of bendable flaps according to certain principles of the present invention.

FIG. 4 is a diagram of a connector device including multiple sets of bendable flaps according to certain principles of the present invention.

As shown, connector device 405 includes sets of bendable flaps 410 spaced apart from each other. Thus, flaps 410 can form corresponding channels 430, 431. Each set of bendable flaps 410 can secure individual conductors to a common electrical node when crimped. It is, therefore, a simpler task to attach multiple conductors such as lead wires to connector device 405. For example, the conductors can be attached at different times.

One method of fabricating connective device 405 is to cut an 'H' shaped pattern out of a flat strip of metal. Thereafter, flaps 410 can be bent so that they are substantially perpendicular to base 420, potentially forming a surface of connector device 405 that can be attached to a complementary shaped surface. For example, a flat base 405 can be formed for attaching connector device 430 to a complementary surface.

Figure 5:
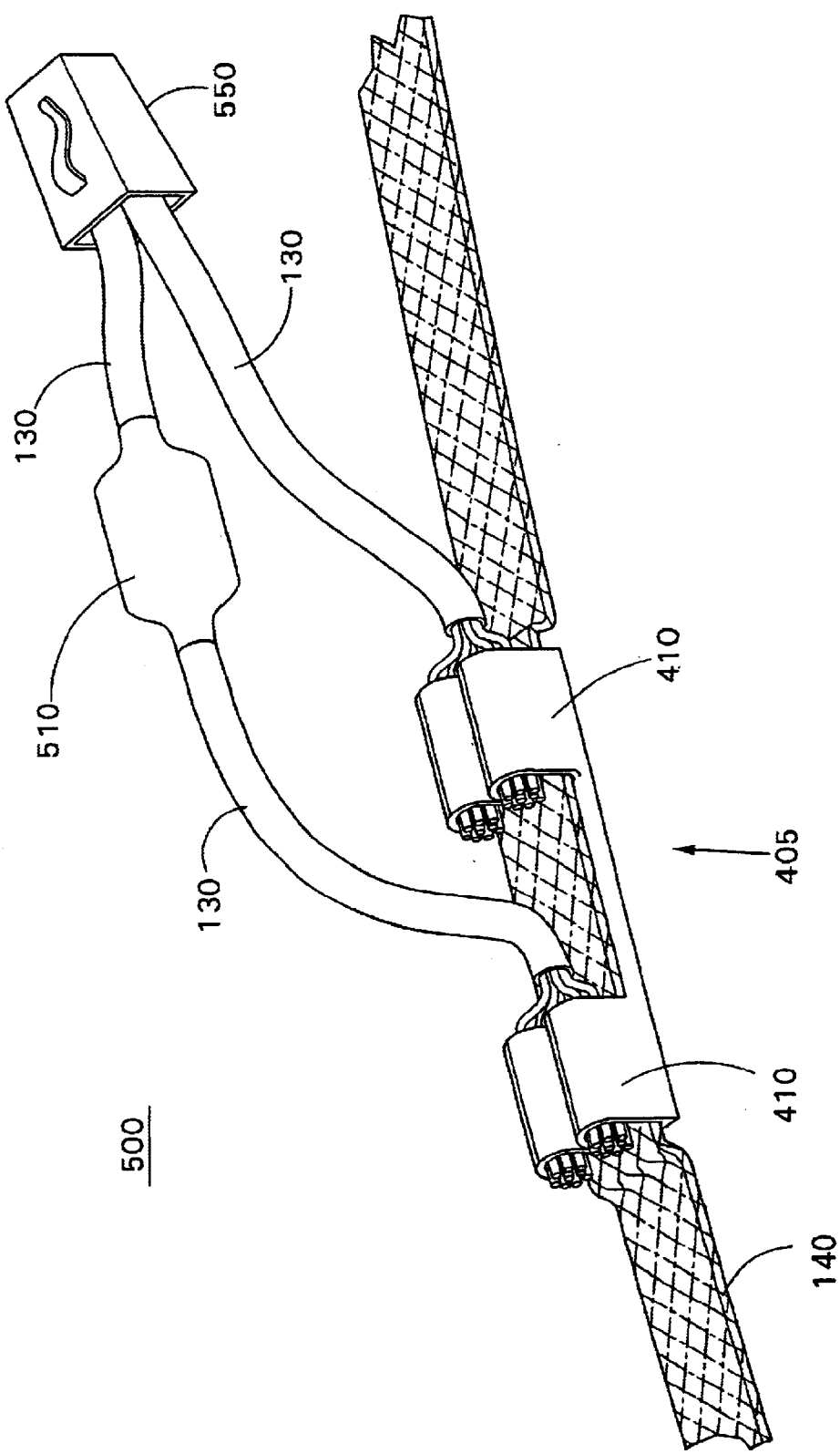
FIG. 5 is a diagram of a connector assembly for attaching a lead wire to a conductive strip according to certain principles of the present invention.

FIG. 5 is a diagram illustrating a device for attaching multiple conductors according to certain principles of the present invention. As discussed, flaps 410 can be crimped to connect multiple lead wires 130 to connector device 405 and, more specifically, conductor 140.

Assembly 500 optionally includes serially disposed electrical component 510 such as a resettable fuse and connector 550.

Figure 6:
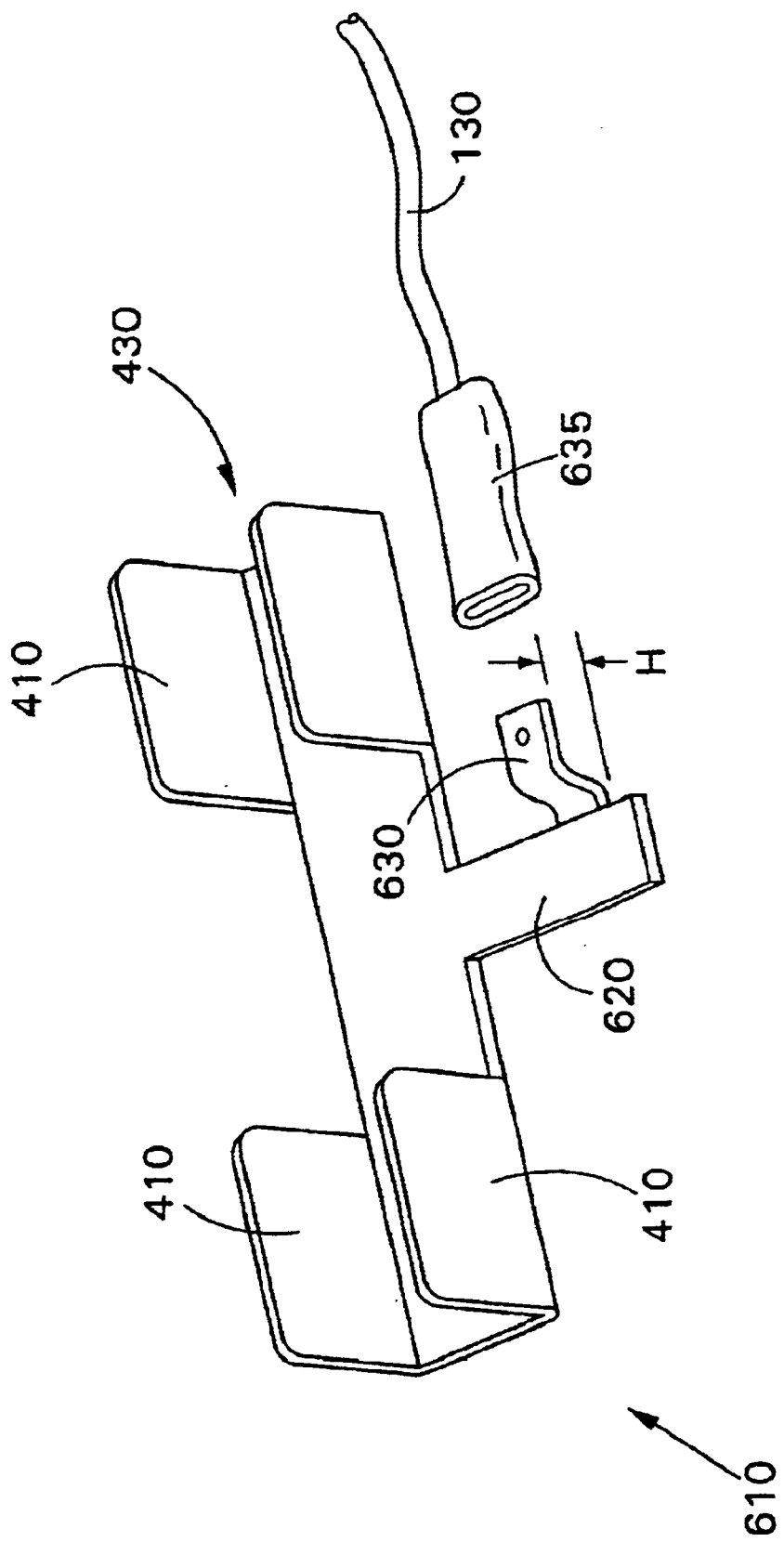
FIG. 6 is a diagram of a connector device including a tongue for attaching a wire lead according to certain principles of the present invention.

FIG. 6 is a diagram of a connector device including an extension for attaching a conductor such as a lead wire according to certain principles of the present invention.

Many features of connector device 610 have been discussed in previous embodiments as discussed. However, device 610 also includes a base extension 620 and tongue 630 such as a protruding portion of metal. In the embodiment shown, tongue 630 is formed so that a conductor such as connector 635 can be attached to a portion of tongue 630 disposed at a height, H, above extension 620. Extension 620 is optional and tongue 630 generally can be connected to any portion of connector device 610. For example, extension 620 itself can be shaped to form a male connector for attaching a lead such as connector 635.

Figure 7:
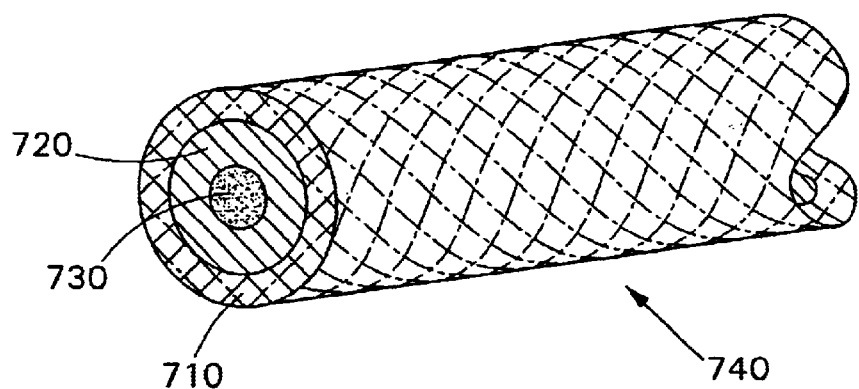
FIG. 7 is a cross-sectional diagram of a braided wire with flux solder core according to certain principles of the present invention.

FIG. 7 is a pictorial view of a conductor according to certain principles of the present invention. As shown, a combination of materials can be used to form a conductor including a wire braid 740 with flux solder core.

Solder wire 720 with a flux core 730 is first provided. Strands of wire are knitted about the outside of the solder wire 720 to produce a braid of wire 710 hugging the outer surface of solder wire 720. Alternatively, a solder wire 720 may be passed through the center of a pre-assembled hollow wire braid 710. The resulting solder-filled braid 740, regardless of the assembly method, resembles a metallic sleeve that runs the length of the overall solder wire 720.

The term "solder" has been used and will be used throughout this specification. It should be noted that this term includes suitable substantially pure metals such as lead or tin as well as solder, commonly so-called, and other fusible alloys or compositions that serve the same purpose. Additionally, "flux" refers to material that aids in the fusion process.

According to another embodiment of the present invention, a solder strip 720 is flattened on a braid or within a braid to produce at least a two layer structure including an unmelted flat bead of solder on a single or double layer of braided wire. A cross section of the picture in FIG. 8 shows a combination of solder 720 and flux 730 on a single or double layer braid of wire 730.

A composition of material by weight, i.e., solder versus braided wire, can be tailored depending on the particular application. For example, some applications require more solder by weight than braided wire, in which case a larger mass, or diameter, of solder is provided at the solder core. Additionally, the thickness of the wire strands or thickness of the overall knitted braid of wire can be tailored depending on the application.

It should be noted that the aforementioned method of combining materials to create a braided wire 740 with a solder core advantageously enables one to achieve very high levels of solder content. For example, it is possible to achieve a mixture of greater than 90% solder and less than 10% braid by weight. Alternative methods, such as pre-soldering the braid, generally cannot produce a braid of wire impregnated with more than 41% solder by total weight. Hence, during the solder process, the inventive combination of material does not require the laborious task of adding solder to the braided strip to achieve a higher percentage of solder by weight as is required for a pre-soldered version. Rather, the present invention advantageously provides the correct solder content at its core prior to the solder process. Overheating of an underlying substrate is avoided because there is no need to add more solder to the surface during the soldering process.

Figure 8:
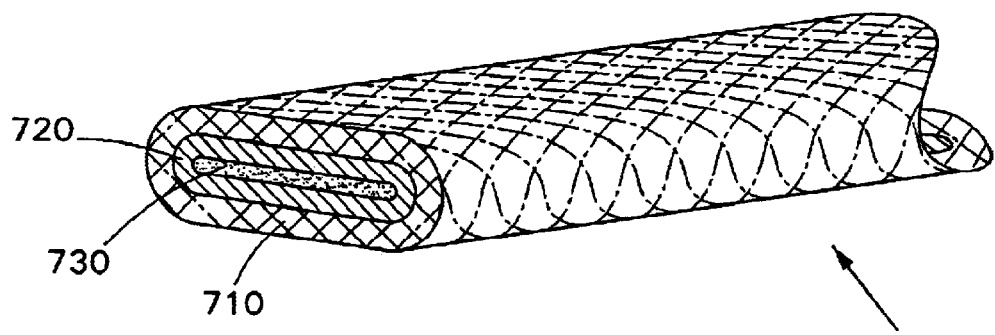
FIG. 8 is a cross-sectional diagram of a flattened braided wire with flux solder core according to certain principles of the present invention.

In the preferred embodiment, the combination of flux 730, solder 720 and braid of wire 710 is flattened with a rolling device to produce a flat wire braid 850 with flux solder core as shown in FIG. 8. Because the solder 720 core is generally malleable, the strands of wire in the braid of wire 710 become embedded in the softer solder 720 material during the flattening process. This flattened braided wire with flux solder core 850 can be used as conductor 140 that is crimped into connector device 110, 405 via bendable flaps 115, 410 as shown in FIGS. 1 and 4.

Referring again to FIG. 8, the combination of solder 720 and braid of wire 710 is flattened for a number of reasons. First, embedding the strands of wire in the solder 720 serves to increase the surface contact between the solder 720 and braid of wire 710, thereby enhancing the thermal conductivity between the two materials, i.e., heat flows more easily from the braided wire in contact with the solder core. When the braid of wire is heated by pressing a hot soldering iron to its outer surface, the heat easily transfers to the core solder wire 720 because of the increased surface area contact between the strands of wire and solder core 720. When the solder core melts, the solder is easily absorbed by the braided wire facilitating the fusion of the braided wire to a conductive node.

Additionally, the combination of material is flattened to produce a flat wire braid 850 because this shape conforms to most conductive electrical node surfaces, which are usually flat or slightly curved surfaces. For example, to create a good solder connection between two conductive materials, both materials generally conform to each other so that both materials become sufficiently heated during the solder process. In fact, it can be necessary to sufficiently heat the conductive strips to avoid creating cold solder joints. Preferably, the two conductive materials touch during the heating process because melted solder adheres and flows based on capillary action. Therefore, better solder joints can be created when the surface area of the materials to be bonded are in close proximity to each other.

Figure 9:
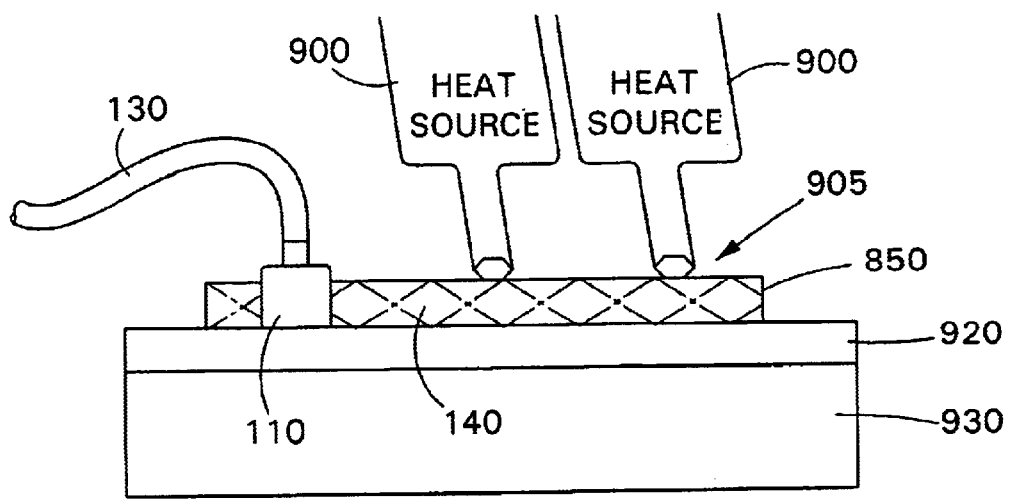
FIG. 9 is a diagram illustrating a method of attaching a conductor and wire lead to a complementary surface according to certain principles of the present invention.

FIG. 9 shows a method of soldering a conductor 140 such as a strip of flat wire braid 850 with flux solder core to a conductive strip 920 adhered to a glass substrate 930. Any of the connective assemblies as previously discussed also can be attached directly to glass or other complementary surface.

Heat can be applied directly to the surface of the conductor 140 at one or multiple points to bring the temperature of the solder core up to its melting point. More specifically, one or multiple heat sources 900 can be used at different positions along the conductor so that a conductor strip is more easily soldered to strip 920. Notably, conductor 140 can include spaced masses of solder 210 as previously discussed.

A substantial portion of the heat can travel down the length of the solder core, rather than through opposing side of the braided wire to the conductive strip 920 adhered to the glass substrate 930. Effectively, conductive strip 920 and glass 930 can be buffered from the hot solder core by the layer of braided wire, until the solder melts and forms a connection between conductor 140 and strip 920. Accordingly, underlying glass 930 is not severely heated during the initial phases of the solder process. As mentioned, conductor 140 and connector device 110 also can be attached directly to glass 930.

Around the time when the solder core reaches its melting temperature at the tip of heat source 900, so does the entire length of the solder core in the braided wire strip 850 because of the high thermal conductivity of the solder core, i.e., the solder core is one solid strip. In some respects, the underlying conductive strip 920 is shielded from severe heat because the solder core has a higher thermal conductivity. Hence, a substantial amount of heat generally passes down the solid core prior to melting.

When braided wire with solder core is used, the solder core melts and changes to a liquid. It is then typically absorbed into the outer walls of the braided wire 850 where heat is then transferred vertically to the underlying conductive strip 920. Because conductive strip 920 is now in direct contact with the braided wire strip 850 filled with molten solder, it experiences an instant rise in temperature. As a result, the solder flows freely onto the surface of the conductive strip 920 or window pane 930 to form a reliable solder joint when the heat source is removed and the area is cooled.

This method of attaching a braided wire strip 850 or conductor 140 including connector device 115 to conductive strip 920 reduces and evenly distributes heat that is transferred to glass substrate 930 during the soldering process. Effectively, a substantial portion of heat imparted by heat source 900 is initially transferred horizontally, or lengthwise, along the braided wire 850 until the solder core melts at which point the heat is then transferred vertically to the conductive strip 920. Although glass 930 is exposed to heat, the aforementioned method is superior to other methods which transfer heat in a substantially vertical direction throughout the soldering process. As a result, the present invention can be used to avoid creating severe "hot spots" in glass 930 that can cause structural damage.

Another advantage of the present invention is the visual clue that indicates when to stop heating the braided wire 850. A technician can note that heat source 900 such as a solder iron should be removed by observing when the solder core changes to a liquid and is absorbed by the braided wire. Because the conductive strip is in contact with braided wire 850, the solder can flow to conductive strip 920 fusing the two conductors when the region is cooled. In general, these visual clues indicate that a good solder contact has been formed between braided wire 850 and underlying conductive strip 920 on glass 930. At this point, or soon thereafter, the technician knows to remove heat source 900 to avoid unnecessarily overheating underlying glass 930.

The inventive method of soldering braided wire 850 or a conductor 140 to a conductive strip 920 over a glass substrate 930 has a more favorable failure mode than other suggested methods. It requires more force to separate the braid from the glass using the adhesion process of the present invention. In particular, it generally requires 15 pounds of pull on the braid 850 to tear it from the conductive strip 920 or glass 930.

Based on other suggested methods such as soldering a pre-soldered braid to a conductive strip adhered to a glass, applying a 5 pound pull on the braid of wire causes the conductive strip to separate from the main piece of glass. Essentially, the effect of heating the glass is so severe using other methods that the structurally damaged glass severs from the main piece of glass before the adhesive solder between the braid and conductive strip separates. Typically, shards of broken glass cling to the conductive strip during the separation process destroying the underlying window. The failure mode of the present invention, therefore, is preferred because there is no damage to the glass and the soldered braid can withstand a greater pulling force.

Figure 10:
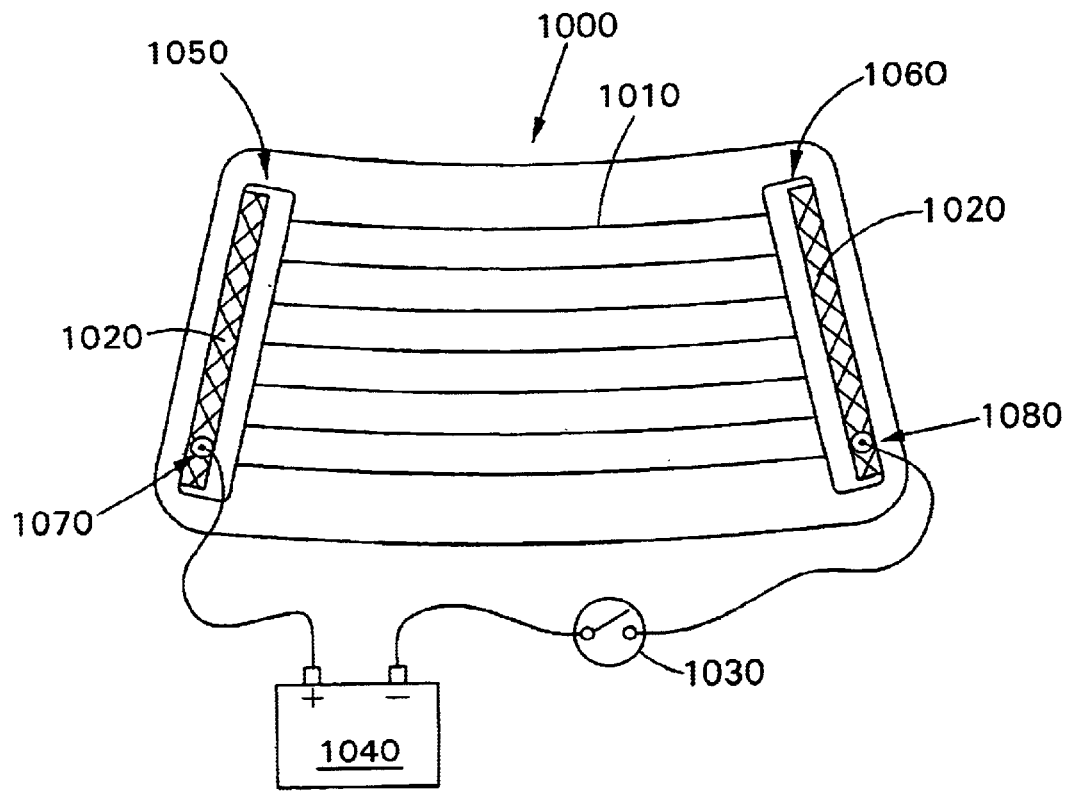
FIG. 10 is a diagram of attaching a conductor and lead wire to glass according to certain principles of the present invention.

One application involves soldering a conductor 140 such as a braided wire 850 to opposing ends of the defroster heating elements on a rear window 1000 of an automobile. For example, see the illustration in FIG. 10. Manufacturers of rear windows 1000 generally provide parallel, horizontal resistive strips 1010 that produce heat when a voltage potential is applied across each end at location 1050 and 1060. In short, the voltage difference 1040 along lengthwise portion of resistive strips 1010 causes current to flow through the resistive strips 1010, thus creating a mild heat source when switch 1030 is turned on.

At some point in the manufacturing process, one or multiple wires 1070 and 1080 must be routed to the vertically positioned buses located at 1050 and 1060 on the left and right side of the rear window 1000. Initially, a braid of wire with a flux solder core 1020 can be cut to length and soldered to the resistive strip on the glass at opposing ends 1050 and 1060. This solder process is described above and illustrated in FIG. 9. The length of the braid 1020 now serves as a highly conductive path where little, if any, heat is dissipated near braid of wire 1020 or conductor 140. Heat can be generated in the middle of the window melting snow or ice along the resistive strips 1010 where a driver is most interested, rather than at the opposing edges located at 1050 and 1060. In other words, the overlaying soldered braid wire 1020 on the wide vertical resistive strips located at 1050 and 1060 tremendously increases current carrying capacity in that region and thereby reduces undesirable heat loss.

A connector device can be soldered along with conductor 140 to the wide vertical resistive strips at either ends located at 1050 and 1060. This is a means by which voltage 1040 can be applied across the horizontal resistive heater strips 1010. Effectively, the braided wire 1020 or conductor 140 can serve as a strong structural support for the wire connector where forces on the electrical connector 1070 or 1080 are distributed along the length of conductor 140. As a result, the connector and supporting strip of braid wire are less likely to be damaged by a mechanic pulling on the wire to disconnect it from the window assembly. A close up view of the electrical connector 1070 and 1080 can be found in FIG. 9 that alternatively shows a side view of the electrical connector 960 and current carrying wire 950.

While this invention has been particularly shown and described with references to preferred embodiments thereof, it will be understood by those skilled in the art that various changes in form and details may be made therein without departing from the spirit and scope of the invention as defined by the appended claims.

What is claimed:

1. An apparatus for attaching conductors, the apparatus comprising:
    a base including an external surface that is eventually attached to a complementary shaped surface; and
    bendable flaps extending from the base for securing a conductor strip when the flaps are crimped, at least a portion of the conductor strip also eventually being affixed to the complementary shaped surface, the conductor strip being bent near the base in a manner for the conductor strip and the base to lie in a common contour.

2. An apparatus as in claim 1, wherein the external surface of the base is flat such that the external surface and said at least a portion of the conductor strip lie in a common plane.

3. An apparatus as in claim 1 in which a strip of flat metal forms the bendable flaps while a portion of the metal strip forms the base.

4. An apparatus as in claim 1 in which multiple sets of said bendable flaps extend from the base so that multiple conductors can be crimped together to the base.

5. An apparatus as in claim 1, wherein the base and bendable flaps are electrically conductive.

6. An apparatus as in claim 1, wherein the external surface of the base is soldered to the complementary shaped surface.

7. An apparatus as in claim 1 further comprising a lead wire crimped to the conductor strip via the bendable flaps.

8. An apparatus as in claim 1 further comprising:
    a tongue extending from the base to which a lead wire can be attached.

9. An apparatus as in claim 8, wherein the lead wire can be removably attached to the tongue.

10. An apparatus as in claim 9, wherein the tongue extends above the complementary surface.

11. An assembly comprising:
    a conductor; and
    a connector device including bendable flaps that secures the conductor when the flaps are crimped, the connector device having an external surface that is eventually attached to a complementary shaped surface, at least a portion of the conductor also eventually being attached to the complementary shaped surface, the conductor being bent near the connector device in a manner for the conductor and the connector device to lie in a common contour.

12. An assembly as in claim 11 further comprising a lead wire.

13. An assembly as in claim 11, wherein the bendable flaps crimp a lengthwise portion of the conductor to a distal end of a lead wire to the conductor.

14. An assembly as in claim 11 further comprising:
    a lead wire that is crimped to the conductor by bending the flaps; and
    wherein a portion of the conductor extending through the connector device deviates such that a surface of the conductor lies in a common plane with the external surface of the connector device.

15. An assembly as in claim 11, wherein the conductor comprises a braided wire.

16. An assembly as in claim 11, wherein the conductor comprises a braided wire with a solder core.

17. An assembly as in claim 11 further comprising:
    solder that attaches the external surface of the connector device to the complementary shaped surface.

18. An assembly as in claim 11, wherein the complementary shaped surface is made of glass.

19. An assembly as in claim 11 wherein the assembly is soldered to automobile glass.

20. An assembly as in claim 11 further comprising:
    individual solder masses attached along a length of the conductor.

21. An apparatus for attaching conductors, the apparatus comprising:

a base including an external surface that is eventually attached to a complementary shaped surface;

a tongue extending from the base to which a lead wire can be attached; and bendable flaps extending from the base for securing a conductor strip when the flaps are crimped, at least a portion of the conductor strip also eventually being affixed to the complementary shaped surface.

22. An apparatus as in claim 21, wherein the lead wire can be removably attached to the tongue.

23. An apparatus as in claim 22, wherein the tongue extends above the complementary surface.

24. An assembly comprising:

a conductor;

a connector device including bendable flaps that secures the conductor when the flaps are crimped, the connector device having an external surface that is eventually attached to a complementary shaped surface, at least a portion of the conductor also eventually being attached to the complementary shaped surface;

a lead wire that is crimped to the conductor by bending the flaps; and wherein a portion of the conductor extending through the connector device deviates such that a surface of the conductor lies in a common plane with the external surface of the connector device.

* * * * *